(12) United States Patent
Lee (10) Patent No.: US 8,812,293 B2
(45) Date of Patent: Aug. 19, 2014

(54) APPARATUS AND METHOD FOR CHANGING LANGUAGE IN MOBILE COMMUNICATION TERMINAL

(75) Inventor: Woo-Kwang Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1208 days.

(21) Appl. No.: 12/559,144

(22) Filed: Sep. 14, 2009

(65) Prior Publication Data

US 2010/0070264 A1    Mar. 18, 2010

(30) Foreign Application Priority Data

Sep. 18, 2008    (KR) .................. 10-2008-0091742

(51) Int. Cl.
*G06F 17/20*    (2006.01)

(52) U.S. Cl.
USPC .................................................. 704/8; 704/9

(58) Field of Classification Search
CPC ...................................................... G06F 9/4448
USPC ........................................................... 704/8, 9
See application file for complete search history.

(56) References Cited

U.S. PATENT DOCUMENTS

| | | | | |
|---|---|---|---|---|
| 5,778,213 A | * | 7/1998 | Shakib et al. ................. | 703/27 |
| 6,469,713 B2 | | 10/2002 | Hetherington et al. | |
| 6,687,736 B1 | * | 2/2004 | Lee ............................. | 709/203 |
| 2003/0081017 A1 | | 5/2003 | Shenassa et al. | |
| 2005/0222839 A1 | | 10/2005 | Chen | |
| 2007/0015538 A1 | | 1/2007 | Wang | |
| 2007/0269776 A1 | * | 11/2007 | Fux et al. .................. | 434/156 |

FOREIGN PATENT DOCUMENTS

| | | |
|---|---|---|
| CN | 101087325 A | 12/2007 |
| EP | 1 233 600 A2 | 8/2002 |
| EP | 1 398 692 A2 | 3/2004 |
| JP | 2007-245850 * | 1/2007 |

OTHER PUBLICATIONS

Wikipedia article on "Computer File" from Sep. 15, 2006, retrieved from the Internet Archive; http://web.archive.org/web/20060915135156/http://en.wikipedia.org/wiki/File_%28computer%29.*

* cited by examiner

*Primary Examiner* — Vincent P Harper (74) *Attorney, Agent, or Firm* — Jefferson IP Law, LLP (57) ABSTRACT

An apparatus and a method for supporting many languages in a mobile communication terminal are provided. In the method, at least two installable languages are determined from a multi language image file comprising language packages of at least two languages. One of the at least two installable languages is selected and installed. The multi language image file is stored. When a language is to be changed, at least two changeable languages are determined from the multi language image file. The installed language is changed by selecting one of the at least two changeable languages. Therefore, a language to be used can be easily changed without separately downloading installation information of languages.

20 Claims, 6 Drawing Sheets

APPARATUS AND METHOD FOR CHANGING LANGUAGE IN MOBILE COMMUNICATION TERMINAL

PRIORITY

This application claims the benefit under 35 U.S.C. §119 (a) of a Korean patent application filed in the Korean Intellectual Property Office on Sep. 18, 2009 and assigned Serial No. 10-2008-0091742, the entire disclosure of which is hereby incorporated by reference.

BACKGROUND OF THE INVENTION

1. Field of the Invention

The present invention relates to an apparatus and a method for managing a language used in a mobile communication terminal. More particularly, the present invention relates to an apparatus and a method for changing the language used in a mobile communication terminal.

2. Description of the Related Art

Mobile communication terminals are widely used throughout the world and provide many conveniences to a user. For example, a mobile communication terminal allows the user to not only place a call while on the move, but also provides many additional functions such as a scheduling function, a phone book function, a camera function, and the like. To execute the functions of the mobile communication terminal, a user may input any of various commands in response to prompts provided on a display. Of course, the prompts and other text displayed must be in a language that the user understands.

To provide convenience and support for different users, a mobile communication terminal may support many languages using a language provisioning function.

In the case of using the language provisioning function, the mobile communication terminal includes various language packages corresponding to various supportable languages. In the case where the mobile communication terminal initially sets a language, the mobile communication terminal provides a user interface which allows a user to select and install an appropriate language using the language packages. Here, each language package includes installation information of the relevant language.

When the user selects a desired language for use, the mobile communication terminal installs the selected language using a corresponding language package. At this point, the mobile communication terminal deletes language packages corresponding to languages not selected by the user. Therefore, the mobile communication terminal cannot change a selected language to a different language once the deletion occurs.

Accordingly, there is a need for an apparatus and a method for supporting many languages in a mobile communication terminal including a method for changing a use language in a mobile communication terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for supporting many languages in a mobile communication terminal.

Another aspect of the present invention is to provide an apparatus and a method for changing a use language in a mobile communication terminal.

In accordance with an aspect of the present invention, a method for installing a language in a mobile communication terminal is provided. The method includes determining at least two installable languages from a multi language image file including language packages of the at least two languages, selecting and installing one of the at least two installable languages, storing the multi language image file, when changing a language, determining at least two changeable languages from the multi language image file, and changing the installed language by selecting one of the at least two changeable languages.

In accordance with another aspect of the present invention, an apparatus for installing a language in a mobile communication terminal is provided. The apparatus includes an input unit for receiving input data from a user, a storage unit for storing a multi language image file including language packages of at least two languages, a controller for, when installing a language, controlling to select and install one of at least two installable languages determined from the multi language image file, and for, when changing a language, controlling to change the installed language by selecting one of the at least two changeable languages determined from the multi language image file, and a display unit for displaying at least one of the installable and changeable languages under control of the controller.

Other aspects, advantages, and salient features of the invention will become apparent to those skilled in the art from the following description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for supporting many languages in a mobile communication terminal.

Exemplary embodiments of the present invention provide a technique for providing a user interface that allows a user to select a language, and providing a user interface that allows a user to change a language in order to support many languages in a mobile communication terminal.

Exemplary embodiments of the present invention assume that a mobile communication terminal uses an operating system of Windows Mobile 6. Of course, application of the invention is not limited to this operating system as it is used merely for convenience of description.

Figure 1:
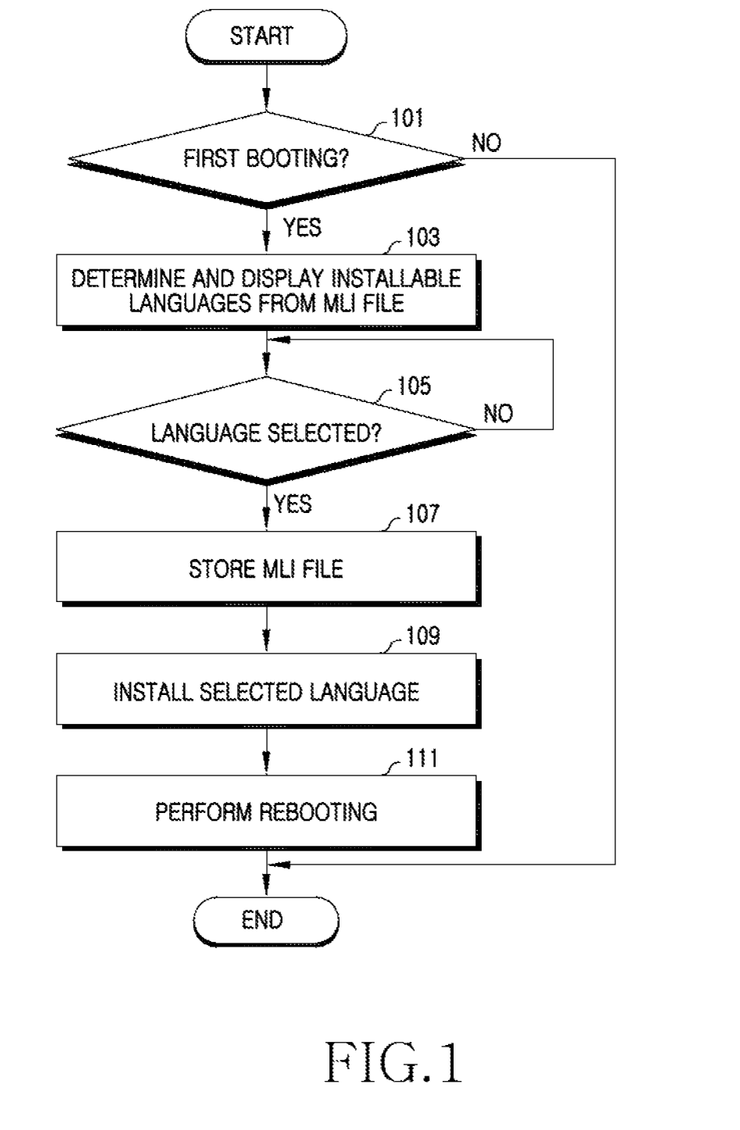
FIG. 1 is a flowchart illustrating a language setting procedure in a mobile communication terminal according to an exemplary embodiment of the present invention.

A mobile communication terminal initially sets a language as illustrated in FIG. 1.

FIG. 1 illustrates a language setting procedure in a mobile communication terminal according to an exemplary embodiment of the present invention.

Referring to FIG. 1, in step 101, a mobile communication terminal determines whether booting is performed for the first time.

When it is determined in step 101 that the booting is not performed for the first time, the mobile communication terminal performs the conventional booting procedure. After that, the mobile communication terminal ends the present algorithm.

Figure 5A:
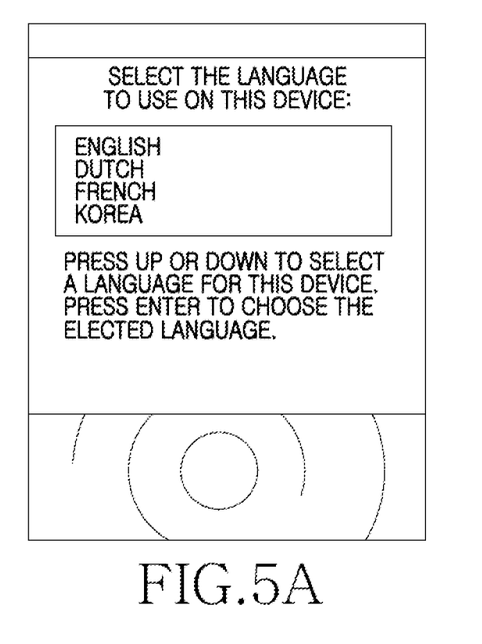
FIGS. 5A through 5C illustrate screens for changing a language in a mobile communication terminal according to an exemplary embodiment of the present invention.

On the other hand, if it is determined in step 101 that the mobile communication terminal performs booting for the first time, the mobile communication terminal determines a list of installable languages from a Multi Language Image (MLI) file and displays the list on a display unit in step 103. For example, as illustrated in FIG. 5A, the mobile communication terminal displays the list of the installable languages so that a user may select a language. Here, the MLI file may include language packages of languages supportable by the mobile communication terminal. The language packages include installation information of a relevant language.

After displaying the list of the installable languages, the mobile communication terminal determines whether a language to be used is selected by the user from the displayed list of the languages in step 105.

When the language to be used for the mobile communication terminal is selected by the user, the mobile communication terminal stores the MLI file in a storage unit in step 107.

Figure 5B:
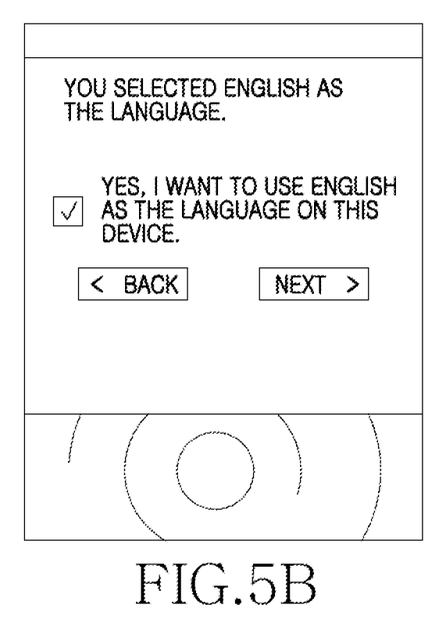
Figure 5C:
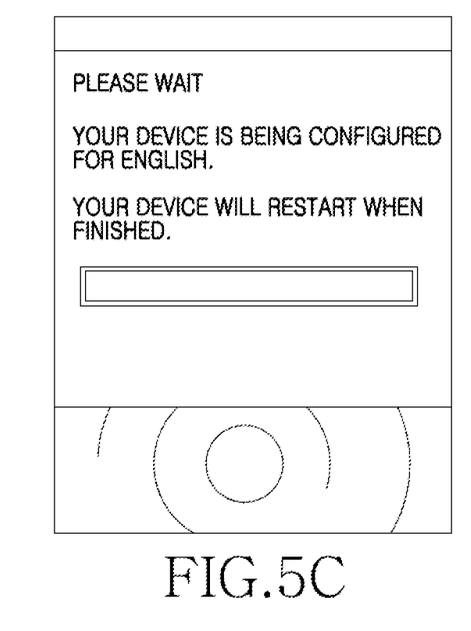

After storing the MLI file, the mobile communication terminal installs the language selected by the user in step 109. For example, when the language to be used for the mobile communication terminal is selected by the user, the mobile communication terminal displays a language selection confirmation screen, as illustrated in FIG. 5B, on the display unit in order to confirm whether the detected language selection is accurate. When the language selection of the user is accurate, the mobile communication terminal displays a language installation screen as illustrated in FIG. 5C on the display unit. In this case, the mobile communication terminal installs the language selected by the user by storing at least one of bootloader information of the MLI file, image information of an Operating System (OS), operator information, and language package information in a drive memory of a language controller.

When the installation of the language selected by the user is completed, the mobile communication terminal activates the installed language through a rebooting in step 111.

After that, the mobile communication terminal ends the present algorithm.

As illustrated in FIG. 1, in an exemplary embodiment of the present invention, a mobile communication terminal performs rebooting in order to activate an installed language.

In an exemplary embodiment of the present invention, a mobile communication terminal may activate an installed language without performing rebooting.

In addition, as illustrated in FIG. 1, in an exemplary embodiment of the present invention, when a language to be used is selected by a user, a mobile communication terminal stores an MLI file and then installs the selected language.

In an exemplary embodiment of the present invention, when a language to be used is selected by a user, a mobile communication terminal may install the selected language and then store an MLI file.

As described above, a mobile communication terminal installs a language selected by a user and then does not delete an MLI file but stores the MLI file. Accordingly, the mobile communication terminal may change the selected language as illustrated in FIG. 2.

Figure 2:
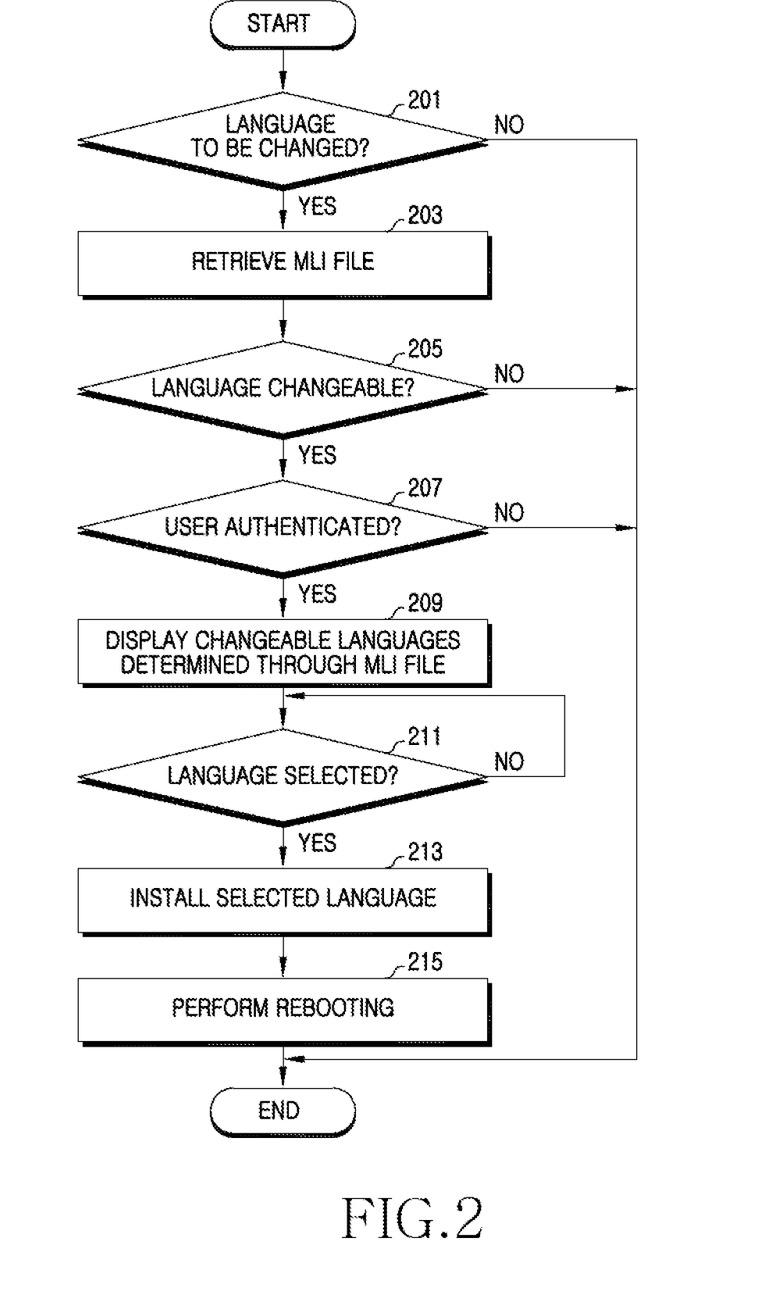
FIG. 2 is a flowchart illustrating a language change procedure in a mobile communication terminal according to an exemplary embodiment of the present invention.

FIG. 2 illustrates a language change procedure in a mobile communication terminal according to an exemplary embodiment of the present invention.

Referring to FIG. 2, in step 201, the mobile communication terminal determines whether to change a language currently in use. For example, the mobile communication terminal determines whether a language change content is selected by a user. At this point, when the language change content is selected by the user, the mobile communication terminal determines that the language currently in use is to be changed by the user. Herein, the language change content includes a language change menu.

Figure 6A:
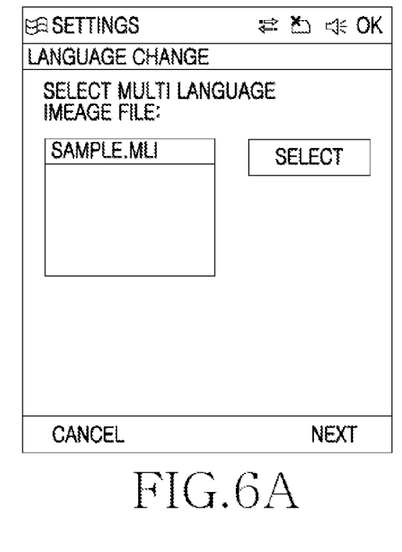
FIGS. 6A through 6D illustrate screens for setting a language in a mobile communication terminal according to an exemplary embodiment of the present invention.
Figure 6B:
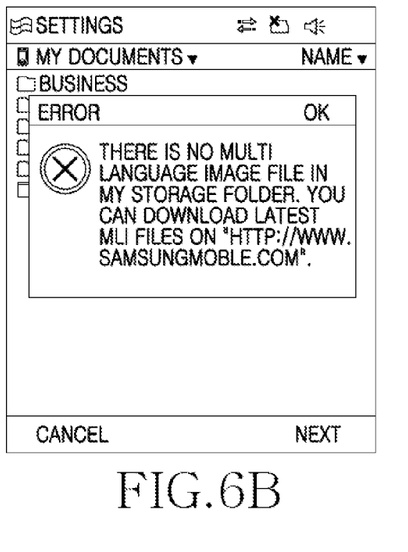

When it is determined in step 201 that the language is to be changed, the mobile communication terminal retrieves an MLI file stored in a storage unit in step 203. For example, when changing the language, the mobile communication terminal determines whether the MLI file exists at a designated position as illustrated in FIG. 6A. When the MLI file does not exist at the designated position, the mobile communication terminal displays a warning message indicating that an MLI file does not exist on a display unit as illustrated in FIG. 6B. In an exemplary implementation, the MLI file may be downloaded or otherwise installed from an external source.

After retrieving the MLI file in step 203, the mobile communication terminal determines whether the language can be changed in step 205. For example, the mobile communication terminal may determine whether the mobile communication terminal has sufficient power to change the language. As another example, the mobile communication terminal may determine whether the MLI file can be used for changing the language by considering the version of the MLI file.

If it is determined in step 205 that the language is not changeable, the mobile communication terminal ends the present algorithm. For example, when the language is not changeable because there is insufficient power, the mobile communication terminal may display a warning message indicating that the language change is not possible because power is insufficient. As another example, if the above-determined MLI file cannot be used in changing a language because of an improper version or the like, the mobile communication terminal may display a warning message indicating that the language change is not possible due to the version of the MLI file.

Figure 6C:
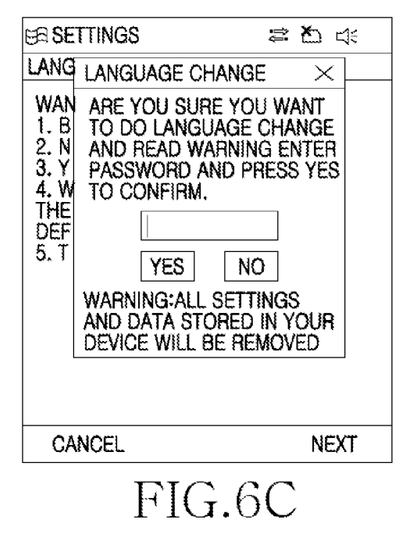
Figure 6D:
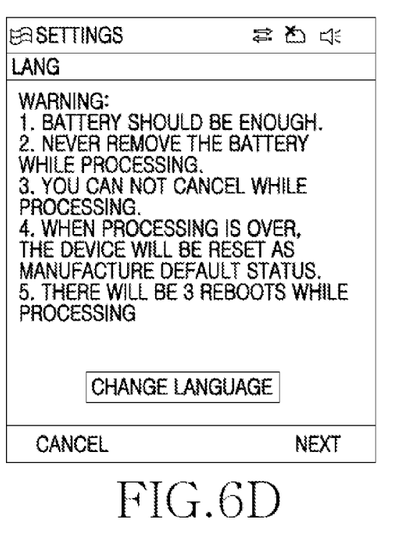

If it is determined in step 205 that the language is changeable, the mobile communication terminal performs an authentication procedure in step 207 to ensure that the user who tries to change the language is authorized to do so. For example, the mobile communication terminal may display a password input window as illustrated in FIG. 6C in order to authenticate the user. At this point, the mobile communication terminal may display cautions for a language change as illustrated in FIG. 6D before displaying a screen for user authentication.

When the authentication of the user fails, the mobile communication terminal ends the present algorithm. At this point, the mobile communication terminal displays a user authentication failure message.

In contrast, when the authentication of the user is successful, the mobile communication terminal performs step 209 to determine a list of installable languages from the MLI file retrieved in step 203 and displays the list on a display unit. For example, when the authentication of the user is successful, the mobile communication terminal performs rebooting to display a list of installable languages during the rebooting process as illustrated in FIG. 5A. At this point, the mobile communication terminal may display cautions for a language change before the rebooting as illustrated in FIG. 6D.

After displaying the list of the installable languages, the mobile communication terminal determines whether a language to be changed is selected by the user from the displayed list of the languages in step 211.

When the language to be changed is selected by the user, the mobile communication terminal installs the language selected by the user in step 213. For example, when the language to be changed is selected by the user, the mobile communication terminal displays a screen for a language selection confirm screen illustrated in FIG. 5B on the display unit in order to confirm whether language selection of the user is accurate. When the language selection of the user is accurate, the mobile communication terminal displays a language installation screen illustrated in FIG. 5C on the display unit. In this case, the mobile communication terminal installs the language selected by the user by storing at least one of bootloader information of the MLI file, image information of an Operating System (OS), operator information, and language package information in a drive memory of a language controller.

When the installation of the language selected by the user is completed, the mobile communication terminal drives the installed language through rebooting in step 215. That is, the mobile communication terminal drives the changed language through rebooting.

After that, the mobile communication terminal ends the present algorithm.

In accordance with an exemplary embodiment of the present invention, a mobile communication terminal performs rebooting in order to activate an installed language.

In accordance with an exemplary embodiment of the present invention, a mobile communication terminal may activate an installed language without performing rebooting.

As described above, when the language of the mobile communication terminal changes, the mobile communication terminal does not delete the MLI file used for changing the language but stores the MLI file in the storage unit.

Figure 3:
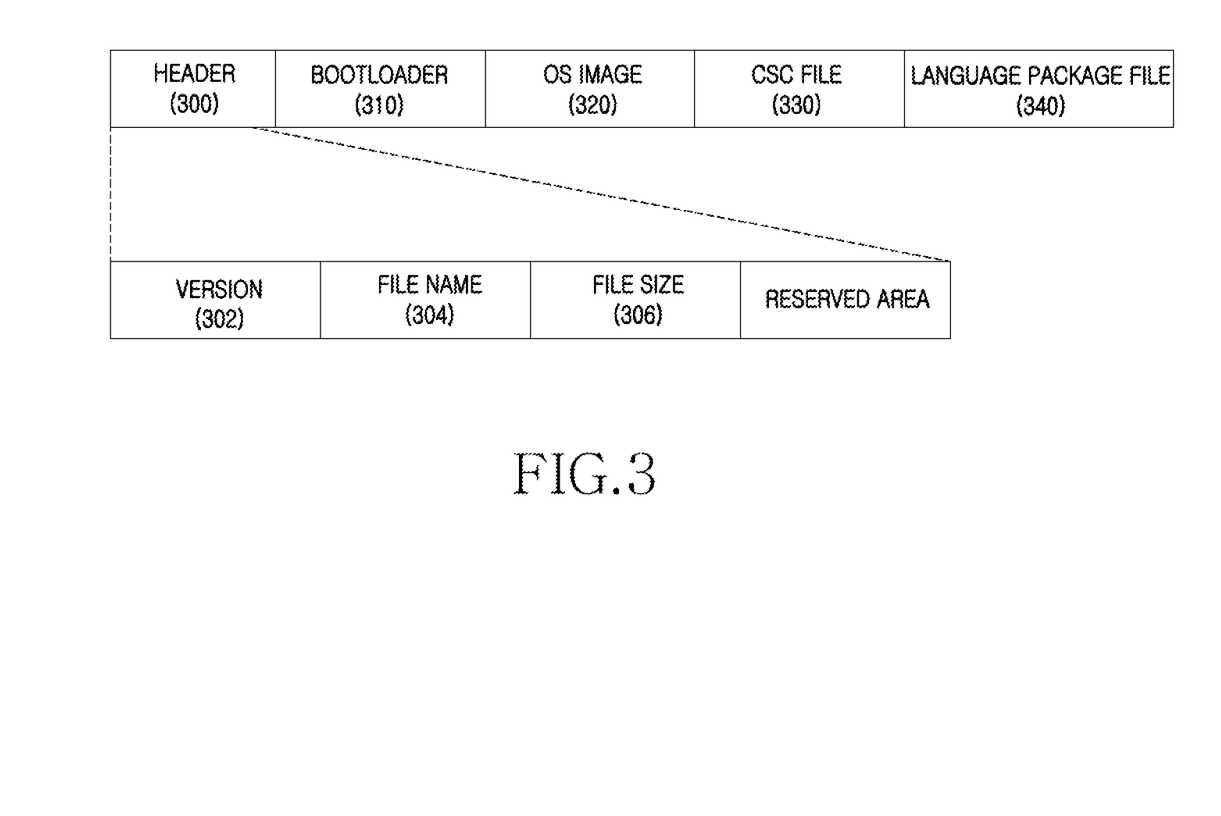
FIG. 3 is a view illustrating a structure of a multi language image file managed by a mobile communication terminal according to an exemplary embodiment of the present invention.

As described above, the mobile communication terminal installs or changes the language using the MLI file. For example, the MLI file is configured as illustrated in FIG. 3. That is, the MLI file includes a header including integrated information of language packages. The header is added to a field where the language packages of languages which can be supported by the mobile communication terminal are integrated.

FIG. 3 illustrates a structure of a MLI file managed by a mobile communication terminal according to an exemplary embodiment of the present invention.

Referring to FIG. 3, the MLI file includes at least one of a header field 300, a bootloader field 310, an OS image field 320, an operator file (CSC file) field 330, and a language package file field 340.

The header field 300 includes construction information of the bootloader field 310, the OS image field 320, the operator file (CSC file) field 330, and the language package file field 340 included in the MLI file. For example, the header field 300 includes a version field 302, a filename field 304, and a file size field 306. The version field 302 includes issue version information of an OS image included in the OS image field 320. The filename field 304 includes the names of the bootloader field 310, the OS image field 320, the operator file (CSC file) field 330, and the language package file field 340. That is, the filename field 304 includes filenames of files including respective fields forming the MLI file.

The file size field 306 includes the sizes of the bootloader field 310, the OS image field 320, the operator file (CSC file) field 330, and the language package file field 340. That is, the file size field 306 includes the sizes of the files including respective fields forming the MLI file.

The bootloader field 310 includes control information for an initial process of a hardware required for the mobile communication terminal to drive the OS. For example, the bootloader field 310 includes information for initializing a central processing unit and peripheral devices, and test information of hardware devices. In addition, the bootloader field 310 includes control information that controls to store an OS image included in the OS image field 320 in a drive memory of a language controller controlling language installation and change.

The OS image field 320 includes an OS image including drive information of an OS.

The CSC file field 330 includes information for adding an OS image depending on each operator. For example, the CSC file field 330 includes information for setting a background screen, an icon, and network configuration information depending on the characteristic of an operator.

The language package file field 340 includes language packages for respective languages that can be supported by the mobile communication terminal.

Hereinafter, a construction of a mobile communication terminal for installing and changing a language is described.

Figure 4:
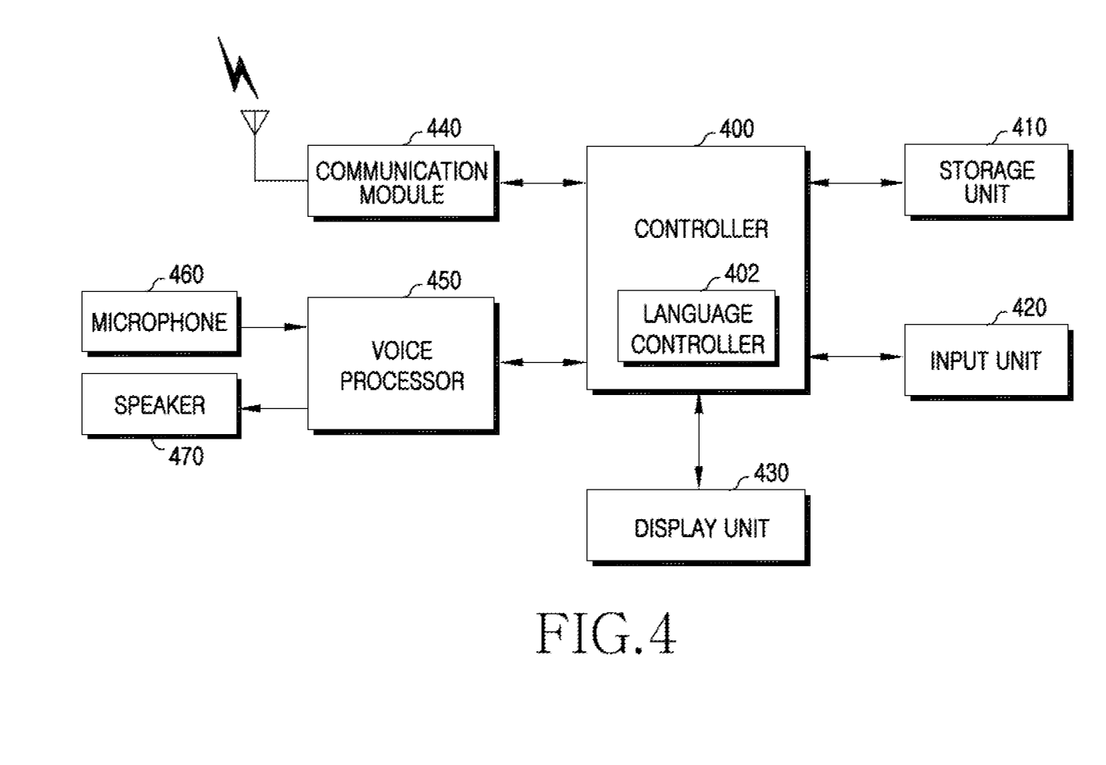
FIG. 4 is a block diagram illustrating a mobile communication terminal according to an exemplary embodiment of the present invention.

FIG. 4 illustrates a block diagram of a mobile communication terminal according to an exemplary embodiment of the present invention.

Referring to FIG. 4, the mobile communication terminal includes a controller 400, a storage unit 410, an input unit 420, a display unit 430, a communication module 440, a voice processor 450, a microphone 460, and a speaker 470.

The controller 400 controls overall operations of the mobile communication terminal. For example, the controller 400 processes and controls voice communication and data communication. Furthermore, the controller 400 controls a language controller 402 to install or change a language so that the mobile communication terminal supports many languages. That is, when the mobile communication terminal performs booting for the first time, the controller 400 controls the language controller 402 to initially set a language. In addition, when language change contents are selected by a user, the controller 400 controls the language controller 402 to change a language.

The language controller 402 controls to initially set and change a language using an MLI file under control of the controller 400. For example, when the mobile communication terminal performs booting for the first time, the language controller 402 controls to display a list of languages that can be installed through the MLI file on the display unit 430. When a language to be installed is selected by a user, the language controller 402 installs the language selected by the user by transmitting at least one of bootloader information, OS image information, operator information, and language package information of the MLI stored in the storage unit 410 to a drive memory according to the bootloader of the MLI file.

For example, when changing a language under control of the controller 400, the language controller 402 determines whether a language is changeable with consideration of at least one of existence of the MLI file, an amount of held power, the version information of the MLI file, and user authentication. When a language is changeable, the language controller 402 controls to display a list of languages that can be installed through the MLI file on the display unit 430. When a language to be changed is selected by a user, the language controller 402 installs the language selected by the user by transmitting at least one of bootloader information, OS image information, operator information, and language package information of the MLI stored in the storage unit 410 to a drive memory according to the bootloader of the MLI file.

The storage unit 410 stores programs for controlling overall operations of the mobile communication terminal, temporary data generated during an operation of the mobile communication terminal, system parameters, and data for storage (phone numbers, Short Message Service (SMS) messages, etc.). At this point, the storage unit 410 stores the MLI file including language packages that can be supported by the mobile communication terminal.

The input unit 420 provides data corresponding to input of the user to the controller 400. For example, the input unit 420 may include a keypad, a touchpad, an optical mouse, etc.

The display unit 430 displays state information generated during an operation of the mobile communication terminal, letters input by the user, moving pictures, and still pictures under control of the controller 400. For example, the display unit 430 displays a screen for installing a language as illustrated in FIGS. 5A, 5B, 5C, and 5D, and a screen for changing a language as illustrated in FIGS. 6A, 6B, and 6C under control of the language controller 402.

The communication module 440 processes a Radio Frequency (RF) signal transmitted/received via an antenna.

The voice processor 450 controls input/output of voices for voice communication using the microphone 460 and the speaker 470.

As described above, since a mobile communication terminal integrates and manages installation information of respective languages, the mobile communication terminal can easily change a language to be used without separately downloading installation information of languages.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for installing a language in a mobile communication terminal, the method comprising:
   determining at least two installable languages from a multi language image file comprising language packages of the at least two languages;
   selecting and installing one of the at least two installable languages;
   storing the multi language image file;
   when changing a language, determining at least two changeable languages from the multi language image file;
   changing the installed language by selecting one of the at least two changeable languages; and
   storing language packages associated with the changed language,
   wherein the multi language image file comprises a header field comprising configuration information of the multi language image file, a bootloader field comprising control information for a hardware initialization process required for driving an Operating System (OS), an OS image field comprising drive information of the OS, and a language package file field comprising a language package for at least one language.

2. The method of claim 1, wherein the multi language image file further comprises an operator information field comprising information added to an OS image depending on an operator.

3. The method of claim 1, wherein the header field comprises at least one of information comprising issue version information of the OS image included in the OS image field, name information of at least one field forming the multi language image file, and size information of at least one field forming the multi language image file.

4. The method of claim 1, further comprising:
   determining whether the mobile communication terminal performs booting for the first time; and
   when the mobile communication terminal performs the booting for the first time, determining the at least two installable languages.

5. The method of claim 1, further comprising:
   displaying the at least two installable languages after the determining of the at least two installable languages; and
   displaying the at least two changeable languages after the determining of the at least two changeable languages.

6. The method of claim 5, wherein the displaying of the at least two changeable languages comprises:
   performing rebooting; and displaying the at least two changeable languages during the performing of the rebooting.

7. The method of claim 5, further comprising displaying cautions for language change before the displaying of the at least two changeable languages.

8. The method of claim 1, further comprising:
when changing the language, determining whether the multi language image file exists in a designated location;
if it is determined that the multi language image file exists in the designated location, determining whether the language is changeable by determining at least one of held power and version of the multi language image file; and
if it is determined that the language is changeable, determining the at least two changeable languages.

9. The method of claim 8, further comprising, when the multi language image file does not exist in the designated location and the language is not changeable, displaying a warning message.

10. The method of claim 8, further comprising:
when the language is changeable, authenticating a user who has requested the language change; and
when the authentication of the user is successful, determining the at least two changeable languages.

11. The method of claim 10, further comprising, when the authentication of the user fails, displaying a warning message.

12. The method of claim 1, further comprising, after at least one of the installing of the language and the changing of the installed language, performing rebooting.

13. An apparatus for installing a language in a mobile communication terminal, the apparatus comprising:
an input unit for receiving input data from a user;
a storage unit for storing a multi language image file comprising language packages of at least two languages;
a controller for, when installing a language, controlling to select and install one of at least two installable languages determined from the multi language image file, for, when changing a language, controlling to change the installed language by selecting one of the at least two changeable languages determined from the multi language image file, and for storing language packages associated with the changed language; and
a display unit for displaying at least one of the installable languages and the changeable languages under control of the controller,
wherein the storage unit stores the multi language image file comprising a header field comprising configuration information of the multi language image file, a bootloader field comprising control information for a hardware initialization process required for driving an Operating System (OS), an OS image field comprising drive information of the OS, and a language package file field comprising a language package for at least one language.

14. The apparatus of claim 13, wherein the multi language image file further comprises an operator information field comprising information added to an OS image depending on an operator.

15. The apparatus of claim 13, wherein the storage unit stores the multi language image file comprising the header field comprising at least one of information comprising issue version information of the OS image included in the OS image field, name information of at least one field forming the multi language image file, and size information of at least one field forming the multi language image file.

16. The apparatus of claim 13, wherein, when the mobile communication terminal performs booting for the first time, the controller determines that the language is to be installed and controls to install the language, and, when receiving selection information of language change contents by a user from the input unit, determines the language is to be changed and controls to change the language.

17. The apparatus of claim 13, wherein, after the determining of the at least two installable languages, the controller controls the display unit to display the at least two installable languages, and, after the determining of the at least two changeable languages, controls the display unit to display the at least two changeable languages.

18. The apparatus of claim 17, wherein, when changing the language, the controller determines whether the language is changeable with consideration of at least one of whether the multi language image file is stored in the storage unit, an amount of held power, version of the multi language image file, and user authentication information.

19. The apparatus of claim 17, wherein when the language is not changeable, the controller controls the display unit to display a warning message.

20. The apparatus of claim 13, wherein after at least one of the installing of the language and the changing of the installed language, the controller controls to perform rebooting.

* * * * *